(12) United States Patent
Erwe et al.

(10) Patent No.: US 8,337,703 B2
(45) Date of Patent: Dec. 25, 2012

(54) PROCESSES FOR THE REGENERATION OF AN ANION EXCHANGER LOADED WITH HEXACHLOROSTANNATE

(75) Inventors: Torsten Erwe, Odenthal (DE); Knud Werner, Krefeld (DE); Dirk Weißenberg, Leverkusen (DE)

(73) Assignee: Bayer MaterialScience AG, Leverkusen (DE)

(*) Notice: Subject to any disclaimer, the term of this patent is extended or adjusted under 35 U.S.C. 154(b) by 855 days.

(21) Appl. No.: 12/173,877

(22) Filed: Jul. 16, 2008

(65) Prior Publication Data

US 2009/0020478 A1 Jan. 22, 2009

(30) Foreign Application Priority Data

Jul. 19, 2007 (DE) .......................... 10 2007 033 524

(51) Int. Cl.
*B01J 49/00* (2006.01)
(52) U.S. Cl. .................. 210/670; 210/683; 210/688
(58) Field of Classification Search .................. 210/670, 210/683, 688; 423/488, 494; 521/26
See application file for complete search history.

(56) References Cited

U.S. PATENT DOCUMENTS 3,252,920 A * 5/1966 Goren Mayer B .............. 521/26
3,531,401 A * 9/1970 Crits .............................. 210/677
6,793,905 B1 * 9/2004 Buttner et al. ................. 423/488

OTHER PUBLICATIONS

Johann Korkisch, Handbook of Ion Exchange Resins, 1998, CRC Press, vol. IV, p. 107.*
Translation of the German article "Use of Ion Exchangers in Analyitical Chemistry" by D. Jentzsch et al, originally published in German on Aug. 23, 1954.*
Translation of the German article "Use of Ion Exchangers in Analytical Chemistry" by D. Jentzsch et al, originally published in German on Aug. 23, 1954, 14 pages.*
D. Jentzch, et al., "Anwendung von Ionenaustauschern in der analytischen Chemie, II. Mitteilung. Adsorptionsverhalten von Elementen an einem Anionenaustauscher in salzsaurer Lösung," *Fresenius Journal of Analytical Chemistry*, (1955), pp. 17-25, vol. 144, No. 1.
"Lewatit-Selective ion exchangers: Instructions for laboratory trials with Lewatit selective exchange resins," *Bayer Technical Information Sheets*, (Jul. 5, 1997), pp. 1-8.

* cited by examiner

*Primary Examiner* — Matthew Savage
(74) *Attorney, Agent, or Firm* — Connolly Bove Lodge & Hutz LLP

(57) ABSTRACT

Processes comprising: providing an anion exchanger at least partially loaded with hexachlorostannate; and contacting the at least partially loaded anion exchanger with a 1 to 10 wt. % hydrochloric acid solution to regenerate the anion exchanger.

1 Claim, 2 Drawing Sheets

PROCESSES FOR THE REGENERATION OF AN ANION EXCHANGER LOADED WITH HEXACHLOROSTANNATE

BACKGROUND OF THE INVENTION

Concentrated hydrochloric acid with a concentration greater than 10 wt. % is often contaminated by heavy metals. Such heavy metal contaminants normally have to be removed before the acid is used further.

Such heavy metal contaminants are known to be removed by contact with anion exchangers, since the heavy metals are, for the most part, present as chloro-complexes. The loaded ion exchangers are then regenerated by treatment with water or bases. During such a regeneration treatment operation, the heavy metal anions are replaced by hydroxide ions and removed from the ion exchanger.

Generally, in cases where the heavy metal contaminants include Sn(IV), the tin is present as a hexachlorostannate complex, which is only stable at high hydrochloric acid concentrations. It is not possible to regenerate the loaded ion exchangers using water, since the tin forms sparingly soluble tin hydroxide, which is precipitated in the ion exchanger.

An Sn(IV)-contaminated ion exchanger can be regenerated with dilute sodium hydroxide solution (concentration approximately 1 to 15 wt. %). The Sn(IV) is converted to a soluble hexahydroxystannate complex. During regeneration with sodium hydroxide solution, however, a large amount of heat of neutralization is released. In addition, a large amount of fresh water has to be used to rinse the ion exchanger.

BRIEF SUMMARY OF THE INVENTION

The present invention relates, in general, to processes for the regeneration of anion exchangers which are loaded with hexachlorostannate. More specifically, present invention relates to processes for the regeneration of anion exchangers loaded with hexachlorostannate, in which little or no precipitation occurs in the ion exchanger and in which large amounts of heat do not have to be dissipated. Moreover, the present invention provides processes for the regeneration of anion exchangers loaded with hexachlorostannate in which large quantities of fresh water are not required for rinsing.

Surprisingly, the present inventors have found that a loaded anion exchanger can be regenerated with a diluted (1-10 wt. %) hydrochloric acid solution.

The various embodiments of the present invention provide processes for the regeneration of anion exchangers which are loaded with hexachlorostannate, in which a hydrochloric acid containing 1 to 10 wt. % HCl is employed to regenerate the exchanger. The regenerating hydrochloric acid solution is preferably dilute hydrochloric acid containing Sn(IV). In various preferred embodiments, the regenerating hydrochloric acid solution is the concentrated hydrochloric acid contaminated with Sn(IV) used for loading the anion exchanger, which is diluted with water prior to being used for regeneration.

One embodiment of the present invention includes processes which comprise: providing an anion exchanger at least partially loaded with hexachlorostannate; and contacting the at least partially loaded anion exchanger with a 1 to 10 wt. % hydrochloric acid solution to regenerate the anion exchanger.

In additional various embodiments of the present invention, providing an anion exchanger at least partially loaded with hexachlorostannate comprises providing an anion exchanger and contacting the anion exchanger with concentrated hydrochloric acid containing Sn(IV).

BRIEF DESCRIPTION OF THE SEVERAL VIEWS OF THE DRAWING

The foregoing summary, as well as the following detailed description of the invention, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown.

In the Drawings.

DETAILED DESCRIPTION OF THE INVENTION

Figure 1:
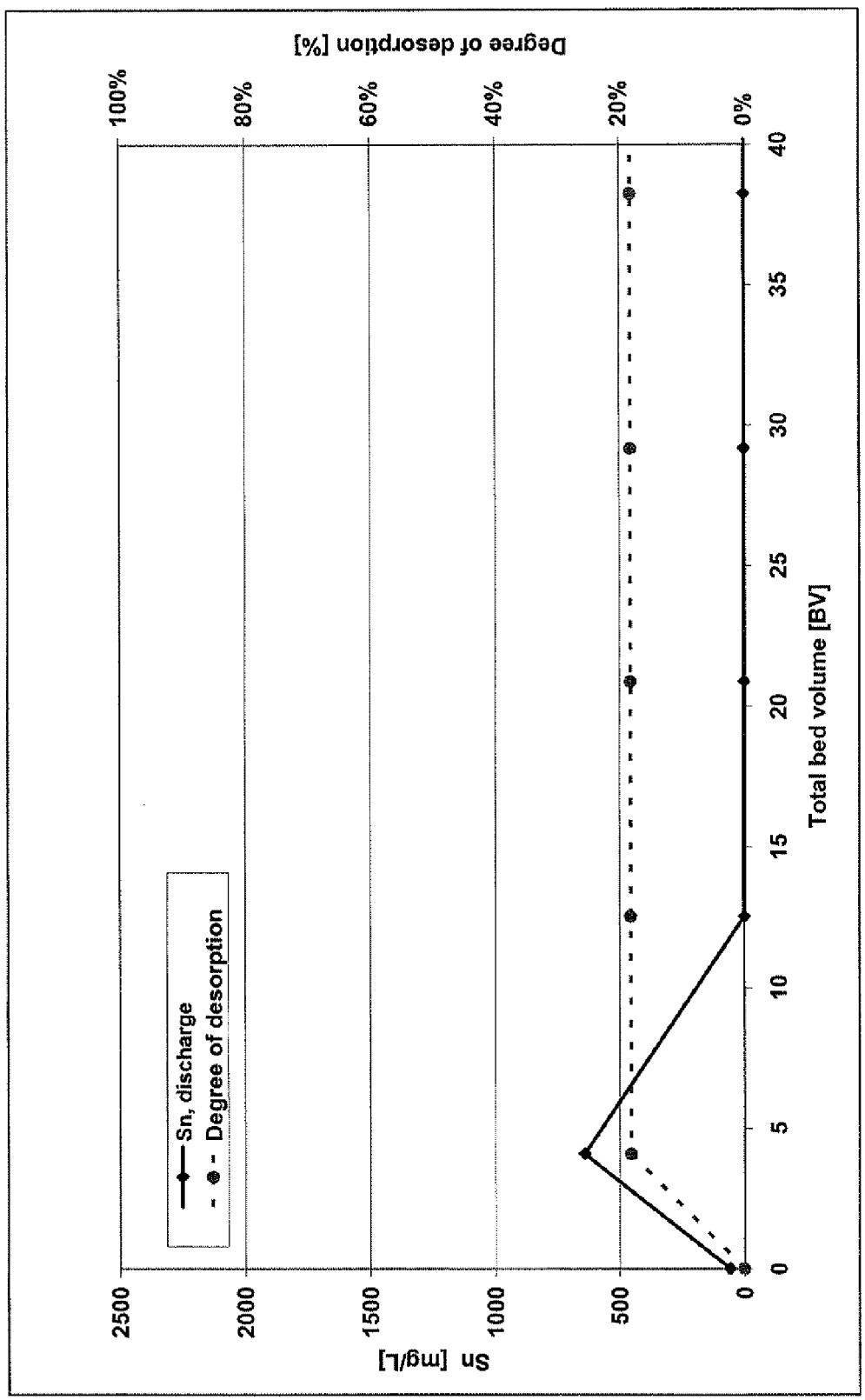
FIG. 1 is a graphical presentation of Sn content in an ion exchange column discharge and the degree of desorption as a function of total bed volume in a regeneration process using water.

As used herein, the singular terms "a" and "the" are synonymous and used interchangeably with "one or more" and "at least one," unless the language and/or context clearly indicates otherwise. Accordingly, for example, reference to "a solution" herein or in the appended claims can refer to a single solution or more than one solution.

The processes according to the various embodiments of the present invention can be carried out using fresh dilute hydrochloric acid. Surprisingly, however, the regeneration of a loaded ion exchanger can be advantageously carried out with a hydrochloric acid solution contaminated with Sn(IV), so long as the solution has an HCl concentration of 1 to 10 wt. %. As used herein, the phrase "contaminated with Sn(IV)" refers to the presence of tetravalent tin regardless of its state, whether it is bound or complexed to any particular additional atoms, and is also inclusive of reference to $SnCl_4$, hexachlorostannate and mixtures thereof, in particular.

The various embodiments of the present invention in which the concentrated hydrochloric acid contaminated with Sn(IV) which causes the loading of the exchanger is used, in diluted form, to regenerate the exchanger provide particularly efficient processes. Concentrated hydrochloric acid contaminated with Sn(IV) can be passed over the anion exchanger for purification (i.e., removal of heavy metal contaminant(s)). When the exchanger is to be regenerated, the concentrated hydrochloric acid contaminated with Sn(IV) can be diluted with water to a concentration of 1 to 10 wt. % HCl and passed through the anion exchanger in order to elute the Sn(IV) bound therein as hexachlorostannate and to regenerate the anion exchanger. When the anion exchanger is sufficiently regenerated, it is possible to switch back to the concentrated hydrochloric acid contaminated with Sn(IV) and the purification of the concentrated hydrochloric acid contaminated with Sn(IV) can be taken up again.

The invention will now be described in further detail with reference to the following non-limiting examples.

EXAMPLES

The loading of two anion exchangers was carried out with a model solution which was produced from tin tetrachloride (SnCl$_4$) and hydrochloric acid with a concentration of 32 wt. %. The tin concentration of the model solution was approximately 100 mg/l. The proportion by weight (w) of the hydrochloric acid was in the range of between 30 and 32%.

In both anion exchangers, a strongly basic anion exchange resin (Lewatit® M500, Lanxess Deutschland GmbH) was employed.

The ion exchangers were loaded and also subsequently regenerated in a temperature-controlled column under the following conditions:

| | |
|---|---|
| Column diameter: | 16.4 mm |
| Bed height: | 51 cm |
| Bed volume: | 108 ml |
| Quantity of ion exchanger: | 67.9 g |
| Temperature: | 22° C. |
| Throughput: | 990 ml/h |
| Filtration rate: | 4.7 m/h |

In these examples, the ion exchangers were loaded with 56.8 mg Sn/g M 500 (38.1 g/l M 500) or 0.62 eq/l.

Comparative Regeneration:

Regeneration of the first ion exchanger was attempted with deionized water, and it was shown that tin was removed from the ion exchanger only at the beginning of the regeneration. As shown in FIG. 1, at the beginning of the regeneration, the hydrochloric acid still present in the column was diluted to lower concentrations and this led to an initial regeneration. This also became clear upon observing the pH values in the column discharge. At the beginning of the regeneration this was still below 0. After it had risen to more than 1, no further regeneration could be detected.

Figure 2:
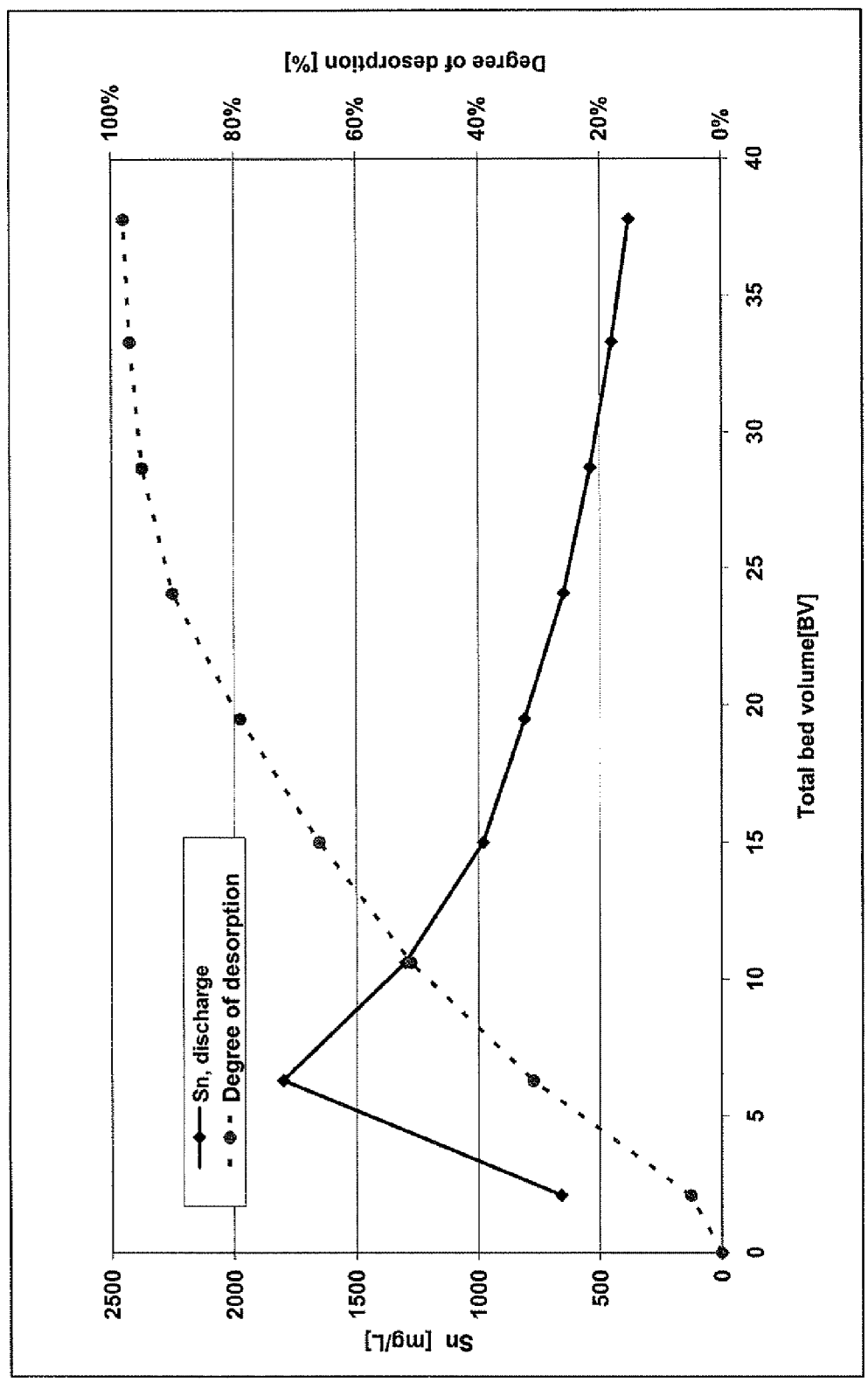
FIG. 2 is a graphical presentation of Sn content in an ion exchange column discharge and the degree of desorption as a function of total bed volume in a regeneration process according to one embodiment of the present invention using dilute hydrochloric acid.

Inventive Regeneration:

The second loaded ion exchanger was regenerated with a hydrochloric acid solution having a concentration of 1.5 wt. %. In this case, it was possible to regenerate the ion exchanger almost completely. This is shown in FIG. 2.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A process comprising:
   (1) providing an anion exchanger;
   (2) at least partially loading said anion exchanger by contacting said anion exchanger with concentrated hydrochloric acid comprising Sn(IV); and
   (3) regenerating said anion exchanger by contacting said anion exchanger with a 1 to 10 weight % hydrochloric acid solution;
   wherein said 1 to 10 weight % hydrochloric acid solution
      (a) further comprises Sn(IV); and
      (b) is provided by diluting said concentrated acid comprising Sn(IV).

* * * * *